(12) United States Patent
Ling

(10) Patent No.: US 7,855,000 B2
(45) Date of Patent: Dec. 21, 2010

(54) OPTICAL ELEMENT WITH ANTI-REFLECTION UNIT

(75) Inventor: Wei-Cheng Ling, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 67 days.

(21) Appl. No.: 12/276,579

(22) Filed: Nov. 24, 2008

(65) Prior Publication Data

US 2009/0258223 A1 Oct. 15, 2009

(51) Int. Cl.
*B32B 9/00* (2006.01)

(52) U.S. Cl. .................. 428/699; 428/432; 428/689; 428/701; 428/702

(58) Field of Classification Search .............. 428/426, 428/432, 689, 699, 701, 702
See application file for complete search history.

(56) References Cited

U.S. PATENT DOCUMENTS

| | | | | |
|---|---|---|---|---|
| 5,667,880 A | * | 9/1997 | Okaniwa | ............. 428/212 |
| 5,719,705 A | * | 2/1998 | Machol | ............. 359/581 |
| 6,104,534 A | * | 8/2000 | Ohta et al. | ............. 359/588 |

* cited by examiner

*Primary Examiner*—Gwendolyn Blackwell
(74) *Attorney, Agent, or Firm*—Andrew C. Cheng

(57) ABSTRACT

An optical element includes a substrate and an anti-reflective unit provided on one surface of the substrate. The anti-reflective unit includes a first coating layer, a second coating layer, a third coating layer, a fourth coating layer, and a fifth coating layer arranged on the substrate sequentially. The thickness of each of the first coating layer, the third coating layer, and the fifth coating layer is in the approximate range from 6 to 100 nanometers, and the thickness of each of the second coating layer and the fourth coating layer is in the approximate range from 10 to 200 nanometers. The first coating layer, the third coating layer, and the fifth coating layer are made of $SiO_2$, and the second coating layer and the fourth coating layer are made of $TiO_2$. The optical element can provide a high rate of light transmission.

1 Claim, 2 Drawing Sheets

OPTICAL ELEMENT WITH ANTI-REFLECTION UNIT

BACKGROUND

1. Technical Field of the Disclosure

The disclosure is related to optical elements, and particularly to an optical element comprising an anti-reflection unit which can increase relative illuminance (RI) of a lens module.

2. Description of the Related Art

A lens module generally comprises a plurality of optical elements, such as concave lenses, convex lenses, image sensors, and so on. One aspect of lens module performance is "relative illuminance," a ratio comparing illuminance of a test point to a measured maximum illuminance. For example, an image captured with incident light at a 0° incident angle has a maximum value of relative illuminance (RI), and the value decreases when the incident angle increases. Conventional lens modules provide anti-reflective coatings on the lenses to increase the relative illuminance. However, one edge of a captured image is normally focused by light with a large incident angle. That is, the value of the relative illuminance on the edge of the image is much less than that at the center of the image. Thus, the relative illuminance values across the whole image are not uniform. Moreover, incident light rays with a large incident angle are partly reflected and partly refracted iteratively by the lenses, whereby the value of the relative illuminance is further reduced. Consequently, the overall non-uniformity of relative illuminance may be significant.

SUMMARY

Therefore, what is needed is an optical element that can overcome the above-described disadvantages.

The disclosure provides an optical element, comprising an anti-reflective unit on a surface of a substrate. The anti-reflective unit comprises a first coating layer, a second coating layer, a third coating layer, a fourth coating layer, and a fifth coating layer arranged sequentially. The fifth coating layer is the outermost of the layers. Each of the first, the third and the fifth coating layers is made of silicon dioxide ($SiO_2$) and has a thickness in the approximate range from 6 to 100 nanometers. Each of the second and the fourth coating layers is made of titanium dioxide ($TiO_2$) and has a thickness in the approximate range from 10 to 200 nanometers.

The optical element comprising the $SiO_2$ and $TiO_2$ coating layers achieves interfaces having different refractive indices. The interfaces generate destructive interference among internal reflected light. Less light is internally reflected, and the transmission rate and relative illuminance which can be provided by the optical element are increased accordingly.

DETAILED DESCRIPTION OF EMBODIMENTS

Various embodiments will be illustrated by the following description with the accompanying drawings.

Figure 1:
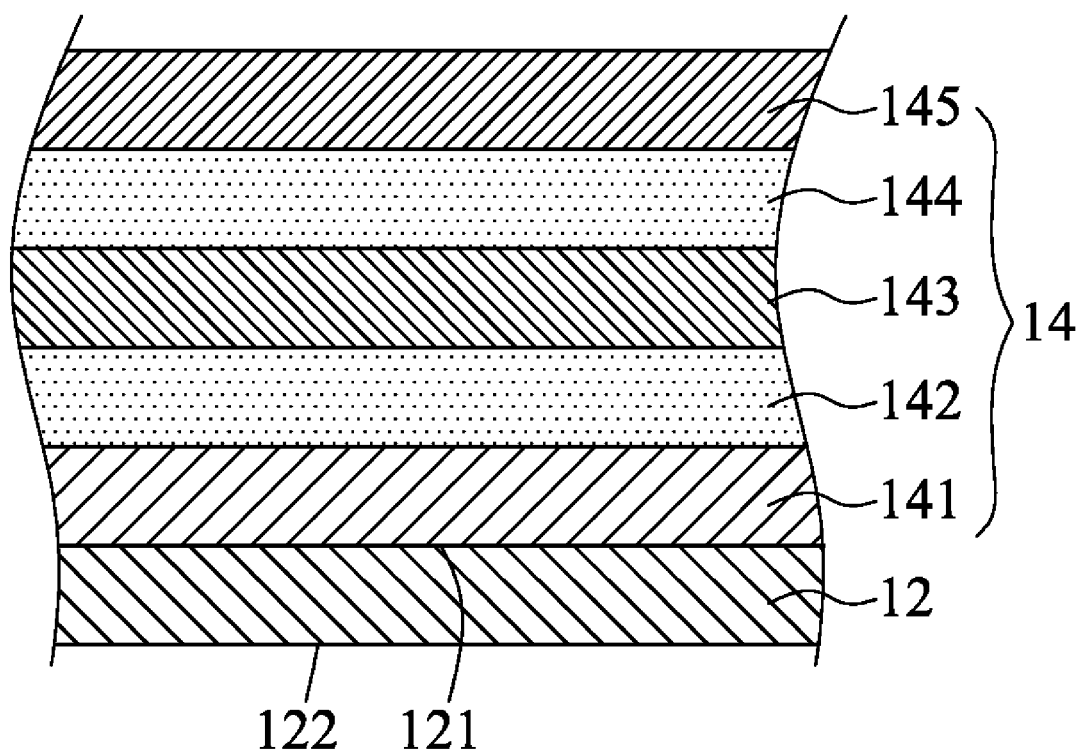
FIG. 1 is a schematic cross-section of part of an optical element according to an embodiment of the disclosure.

FIG. 1 shows part of a light element 10, which comprises a substrate 12 and an anti-reflective unit 14 provided on the substrate 12.

The substrate 12 may be optical glass or optical plastic, and may be transparent. The substrate 12 has an incident surface 121 and an emitting surface 122 at opposite sides thereof. Light incident upon the incident surface 121 propagates into the substrate 12, and then exits via the emitting surface 122.

The anti-reflective unit 14 is provided on the incident surface 121, and sequentially includes a first coating layer 141, a second coating layer 142, a third coating layer 143, a fourth coating layer 144, and a fifth coating layer 145, with the fifth coating layer 145 being the outermost.

Each of the first coating layer 141, the third coating layer 143, and the fifth coating layer 145 is made of $SiO_2$ having a low refractive index, and has a thickness in the range from approximately 6 nanometers (nm) to approximately 100 nm.

Each of the second coating layer 142 and the fourth coating layer 144 is made of $TiO_2$ having a high refractive index, and has a thickness in the range from approximately 10 nm to approximately 200 nm.

The first coating layer 141, the second coating layer 142, the third coating layer 143, the fourth coating layer 144, and the fifth coating layer may be formed sequentially on the incident surface 121 using vapor deposition, such as vacuum deposition, plasma deposition, sputtering, etc.

In use of the light element 10, incident light propagates through the fifth coating layer 145, the fourth coating layer 144, the third coating layer 143, the second coating layer 142 and the first coating layer 141 and into the incident surface 121. The light strikes the various interfaces between the adjacent coating layers 145, 144, 143, 142, 141 having different refractive indices, and reflected light rays undergo destructive interference. Less light is internally reflected, and the transmission rate and relative illuminance which can be provided by the optical element are increased accordingly. As a result, more incident light can propagate into the substrate 12. Therefore, the transmission rate of the incident light through the light element 10 is increased.

Figure 2:
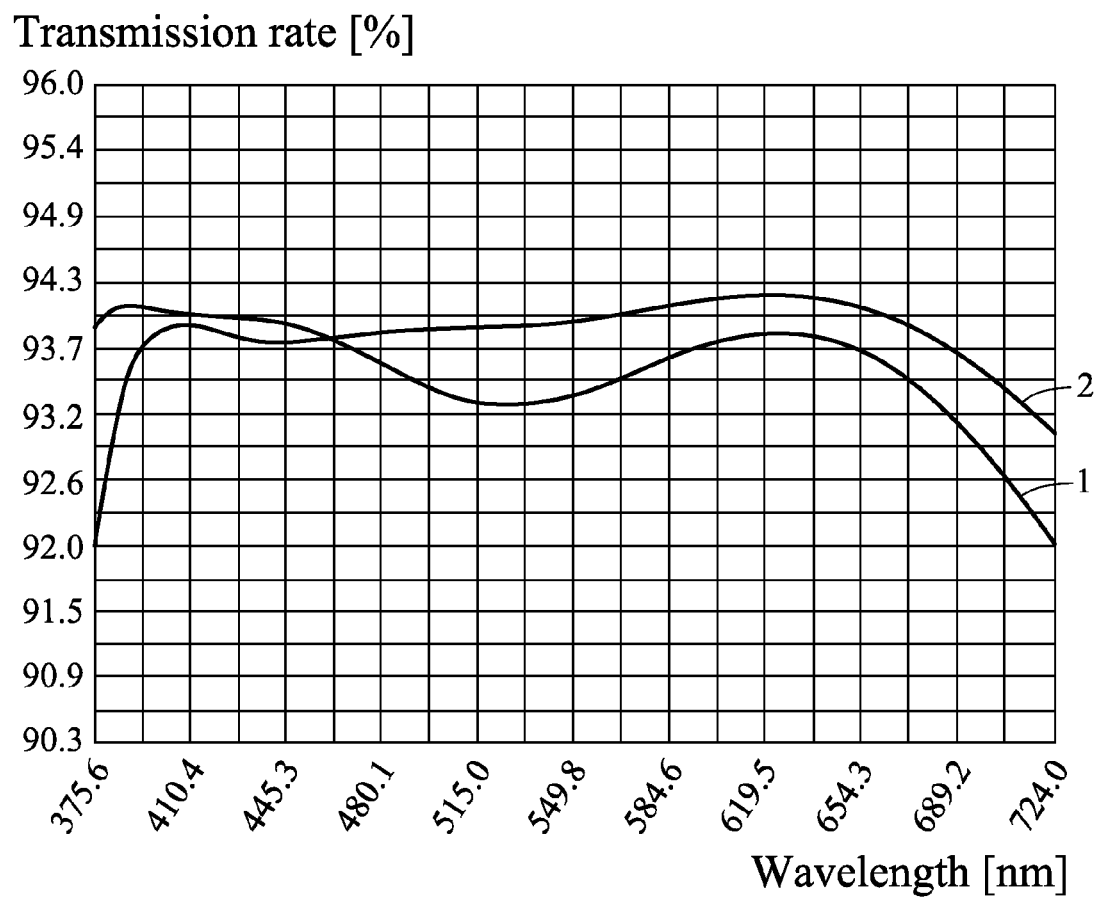
FIG. 2 is a chart comparing transmission rate characteristics of the disclosed optical element with that of a commonly used optical filter.

In the chart of FIG. 2, the horizontal axis represents the wavelength of incident light rays, and the vertical axis represents the transmission rate of incident light rays.

Curve 1 shows the relationship between wavelength and transmission rate for a conventional anti-reflective unit ("sample 1"), and curve 2 shows the relationship for the anti-reflective unit 14 ("sample 2"). Sample 1 consists of a conventional arrangement of coatings, and sample 2 consists of the coatings as disclosed herein. Constructions of samples 1 and 2 are shown in Table 1 below:

TABLE 1

| SAMPLE 1 | | SAMPLE 2 | |
|---|---|---|---|
| Coating layer | Thickness (nm) | Coating layer | Thickness (nm) |
| 1st coating layer | 41.353 | 1st coating layer | 8.822 |
| 2nd coating layer | 16.219 | 2nd coating layer | 15.566 |
| 3rd coating layer | 36.758 | 3rd coating layer | 36.654 |
| 4th coating layer | 130.622 | 4th coating layer | 131.999 |
| 5th coating layer | 87.300 | 5th coating layer | 97.785 |

Curve 1 shows that when the wavelength is within the range of 480.1 to 619.5 nm, the transmission rate of sample 1 is 93.2% to 93.7%, and the relationship variation between the transmission rate and the wavelength is quite non-uniform. In particular, when the wavelength increases within the range of 480.1 to 619.5 nm, the transmission rate at first gradually decreases, and then gradually increases. When the wavelength exceeds 619.5 nm, the transmission rate decreases.

Curve 2 shows that when the wavelength is within the range of 480.1 to 619.5 nm, the transmission rate of sample 2 exceeds 93.7%, and the relationship variation between the transmission rate and the wavelength is considerably more uniform than for sample 1. In particular, when the wavelength increases within the range of 480.1 to 619.5 nm, the transmission rate gradually increases. When the wavelength exceeds 619.5 nm, the transmission rate decreases, but still exceeds the transmission rate of sample 1 at the same wavelengths.

The foregoing description of exemplary embodiments has been presented only for the purposes of illustration and description, and is not intended to be exhaustive or to limit the disclosure to the precise forms provided. Many modifications and variations are possible in light of the above teachings. The embodiments are chosen and described in order to explain the principles of the invention and their practical application so as to enable others skilled in the art to utilize the disclosure and various embodiments and with various modifications as are suited to the particular use contemplated. Alternative embodiments will become apparent to those skilled in the art to which this disclosure pertains without departing from its spirit and scope. Accordingly, the scope of this disclosure is to be defined by the appended claims rather than the foregoing description and the exemplary embodiments described therein.

What is claimed is:

1. An optical element, comprising:

a substrate;

an anti-reflective unit on a surface of the substrate, the anti-reflective unit comprising a first coating layer having a low refractive index, a second coating layer having a high refractive index, a third coating layer having a low refractive index, a fourth coating layer having a high refractive index, and a fifth coating layer having a low refractive index arranged sequentially, wherein the first coating layer is the innermost of the layers, the fifth coating layer is the outermost of the layers, each of the first, the third and the fifth coating layers is made of $SiO_2$, each of the second and the fourth coating layers is made of $TiO_2$, the thickness of the first coating layer is approximately 8.822 nanometers, the thickness of the second coating layer is approximately 15.566 nanometers, the thickness of the third coating layer is approximately 36.654 nanometers, the thickness of the fourth coating layer is approximately 131.999 nanometers, and the thickness of the fifth coating layer is approximately 97.785 nanometers.

* * * * *